Nov. 19, 1940. C. C. SHUTT Re. 21,629

ANGLE SWITCHING DEVICE FOR SYNCHRONIZING TWO SYNCHRONOUS MOTORS

Original Filed July 16, 1935 2 Sheets-Sheet 1

WITNESSES:

E. A. McCloskey.

Wm. C. Groome

INVENTOR

Charles C. Shutt.

BY

Paul E. Friedemann

ATTORNEY

Nov. 19, 1940. C. C. SHUTT Re. 21,629

ANGLE SWITCHING DEVICE FOR SYNCHRONIZING TWO SYNCHRONOUS MOTORS

Original Filed July 16, 1935 2 Sheets-Sheet 2

WITNESSES:

E. A. McCloskey

Wm. C. Froome

INVENTOR

Charles C. Shutt

BY

Paul E. Friedemann

ATTORNEY

Reissued Nov. 19, 1940 Re. 21,629

UNITED STATES PATENT OFFICE 21,629

ANGLE SWITCHING DEVICE FOR SYNCHRONIZING TWO SYNCHRONOUS MOTORS

Charles C. Shutt, Lima, Ohio, assignor to Westinghouse Electric & Manufacturing Company, East Pittsburgh, Pa., a corporation of Pennsylvania Original No. 2,175,923, dated October 10, 1939, Serial No. 31,614, July 16, 1935. Application for reissue September 28, 1940, Serial No. 358,892

3 Claims. (Cl. 171—118)

Figure 1:
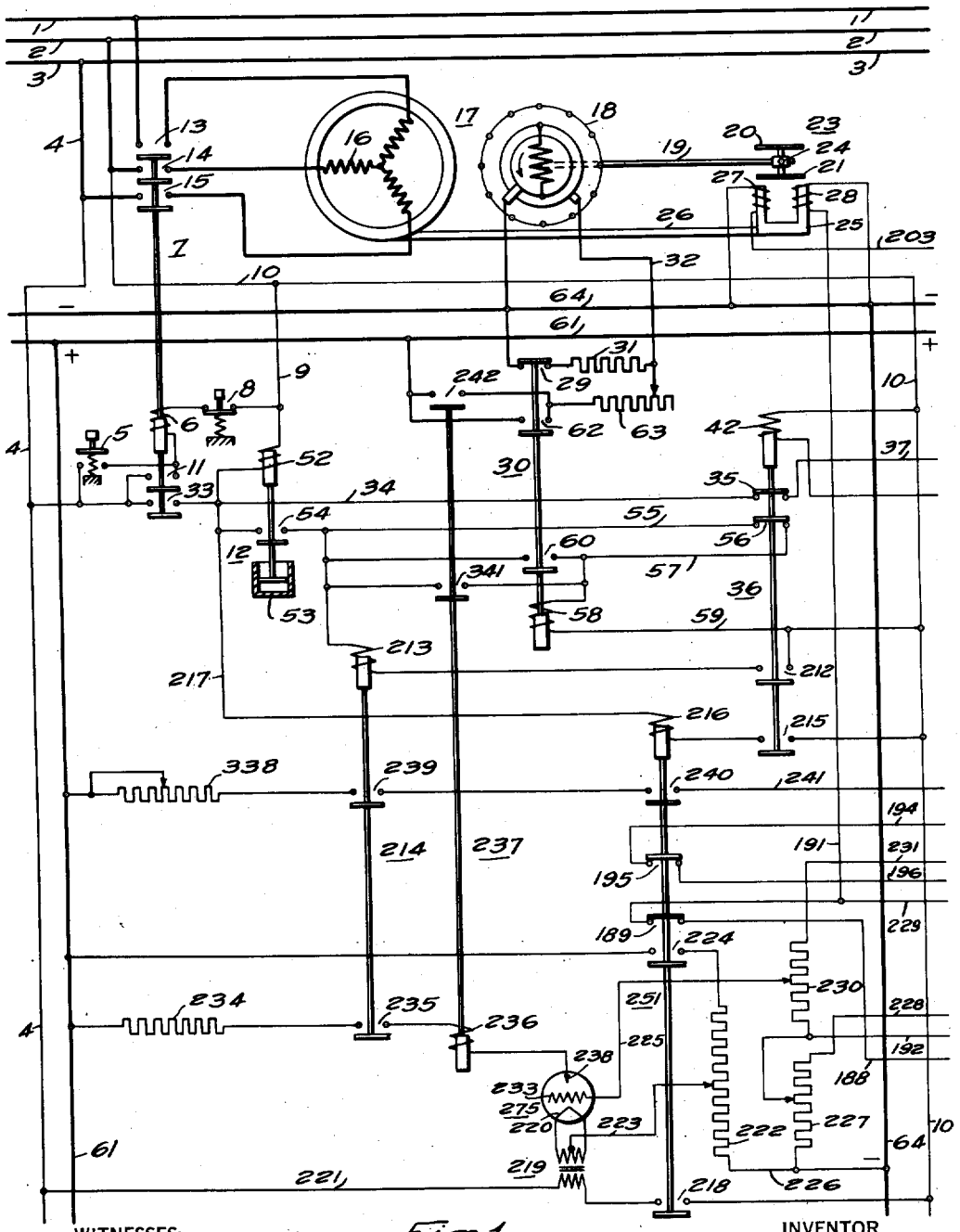

My invention relates to means for effecting a given relative operating position of two or more shafts which are to operate in synchronism.

More particularly, my invention relates to electric control systems whereby the relative rotor positions at a given instant of two or more electric motors operating in synchronism is effected.

It often happens that the load characteristics, namely, the variations of torque of the load driven by one prime mover has periodic variations. When several such loads are to be coupled to a prime mover it is desirable that the driven shafts be coupled to the prime mover in such relative angular relation with reference to corresponding planes including the driven axes that the peak torques of all the loads do not occur at the same time.

One object of my invention is to provide for driving two or more shafts in synchronism but in such relative relation that corresponding points on the shafts hold selected positions with reference to corresponding planes including said respective shafts.

The advantages of my invention are particularly noticeable in conjunction with the operation of a plurality of synchronous motors driving loads of varying character, as for instance compressors.

Synchronous motors are, as a rule, started as induction motors and at or near synchronism transferred from induction motor operation to synchronous motor operation. If several synchronous motors are connected to the same source of supply, the desirable starting operation is that all the motors are not synchronized at the same time. Furthermore, if the motors are coupled to loads that vary periodically it is very desirable that the peak loads on the motors do not occur at the same instant.

For instance, if two or more synchronous motors are to operate compressors, it would not be desirable that the crank arms occupy the same relation during synchronous operation. If the motors could be synchronized so that corresponding poles hold different positions at a given instant during synchronous operation, it is apparent that the peak loads for the respective motors would occur at different times.

One object of my invention is to so synchronize a plurality of synchronous motors that corresponding pole pieces hold selected positions at a given instant during synchronous operation.

Another object of my invention is to control the successive synchronization of a plurality of motors so that corresponding points on the shafts of the motors hold selected angular positions at a given instant with reference to corresponding planes including the axes of the respective motors.

Another object of my invention is to synchronize a synchronous motor at such an instant that its shaft will hold a given relation to the shaft of another synchronous motor operating at synchronism.

A still further object of my invention is to control the successive synchronization of synchronous motors by electric discharge means that are made responsive to the relative angular disposition of the shafts at a given instant.

Figure 2:
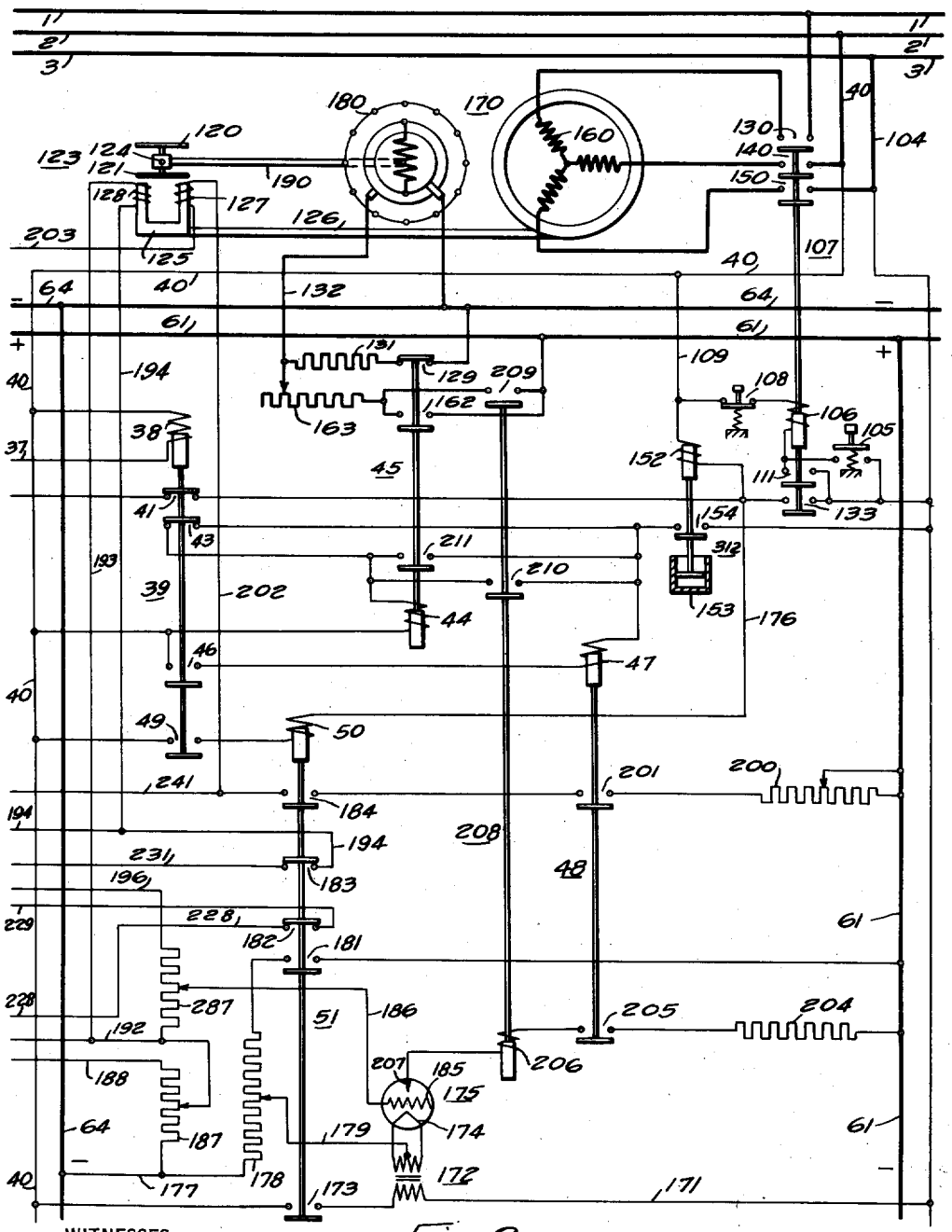

Other objects and advantages of my invention will become more apparent from a study of the following specification when taken in conjunction with the accompanying drawings, in which:

Figure 1 shows a starting control scheme for a synchronous motor, and a portion of the combined control scheme constituting my invention; and Fig. 2 shows a starting control scheme for a synchronous motor, and the remaining portion of the combined control scheme constituting my invention.

Referring more particularly to Figs. 1 and 2 of the drawings, the reference character 17 designates a synchronous motor which may be connected to the source of supply represented by the conductors 1, 2 and 3 by suitable operation of the contactor 7. In the particular arrangement shown in both figures time limit control means are shown for both motors 17 and 170. The time limit device in Fig. 1 is represented by an electromagnetic device 12 provided with a dashpot 53. The field winding of the motor is arranged to be connected to a pair of direct current buses 61 and 64 by the main field switch 30 and a high speed field switch 237. The high speed field switch 237 is suitably controlled by the electric discharge device 275.

In Fig. 2, motor 170 may be similarly interconnected with the source of alternating current represented by the conductors 1, 2 and 3 by the contactor 107, a time limit device 312 is shown for delaying the energization of the field winding with direct current from the direct current buses 61 and 64 by the main field switch 45.

A high speed field switch 208 may also connect the field winding of motor 170 to the source of direct current when the electric discharge device 175 becomes conducting.

As hereinbefore pointed out in the objects, it is one of the desirable features of my system of control to synchronize either one of the two motors shown when the other is operated in synchronism at such an instant that the shaft of the motor last to synchronize will hold a definite relation with reference to the shaft of the motor first to synchronize.

In the drawings, motor 17 is provided with an impulse generator 23, whereas motor 170 is provided with an impulse generator 123. These impulse generators are so arranged that their voltage impulses occur at the same instant when certain points on the shafts of the respective motors hold different angular positions with reference to the axis of the motor shafts and corresponding points on the stators.

The impulse generators are arranged to vary the grid bias of the electric discharge devices shown and the arrangement of the circuits is such that the particular electric discharge device that is to be caused to operate will only operate when the voltage impulses act concurrently or additively.

As hereinafter explained more in detail, when one of the motors is caused to synchronize, certain electro-magnetic devices and one of the electric discharge devices is disconnected so that it is not utilized for the synchronization of the motor last to be synchronized, but the scheme of control is such that no particular order of synchronization of the motors need be selected. Motor 170 may be started first or motor 17 may be started first. If motor 170 is started first, electric discharge device 275 in Fig. 1 is the device utilized for controlling the synchronization of motor 17. Furthermore, if motor 17 is synchronized first, the electric discharge device 175 is utilized to synchronize motor 170.

If motor 17 is operating at synchronous speed and motor 170 has attained its balance speed operating as an induction motor and the time limit device 312 has operated, the impulse generators will cause the operation of the electric discharge device 175 and synchronize motor 170 at such an instant that the peak loads on the two motors will not occur at the same time.

A better understanding of the novel features of my invention can probably be had from a study of typical operating sequences for the two motors that are to be energized and synchronized in such a manner that corresponding pole pieces are disposed in different relation on the two motors or what is more important that the crank arms on the shafts of the motor be in different operating relation.

Assuming that conductors 1, 2 and 3 are suitably energized by an alternator or be energized from conventional power means, and the attendant wishes to set motors 17 and 170 in operation in the desired manner. Further, assuming for the first sequence of operation that the attendant wishes to start motor 17 first. He thereupon actuates the push button switch 5 thereby establishing an energized circuit from conductor 3 through conductor 4, push button switch or starting switch 5, actuating coil 6 of the contactor 7, stop switch 8 and conductors 9 and 10 to the energized conductor 2. Energization of the actuating coil 6 causes the operation of the contactor 7 thereby closing the contact members 11 whereby a holding circuit is established for the actuating coil 6 through the contact members 11 and the starting switch 5 may be released.

Further, the operation of the contactor 7 closes the contact members 13, 14 and 15 thereby connecting the primary winding 16 to the conductors 1, 2 and 3 to thus energize the motor 17. In the particular motor shown, the primary 16 constitutes the stator whereas the rotor 18 carries the direct current field of the motor 17.

My system of control is in this application shown in conjunction with a pair of synchronous motors of like design. However, it is apparent that some of the novel results hereinbefore pointed out and to be pointed out further hereinafter may be obtained even in connection with other than synchronous motors.

The rotor has a shaft 19 to which the load may be coupled but which also may carry one, or as shown a pair of bars 20 and 21 of magnetizable material of an impulse generator 23 adjustably mounted on the shaft 19 by the adjusting means 24. The impulse generator 23 has a stator member 25 disposed adjacent the bars 20 and 21 and rigidly secured to the stator 16 by the securing means 26. If it be assumed that the synchronous motor 17 is driving a compressor, it will be readily apparent that the load is of a very fluctuating character and comes to a high value during certain portions of the revolution or often a certain point during each revolution of the motor shaft. By properly positioning the members 20 and 21 with reference to the stator 25, impulses may be generated in the coils 27 and 28 mounted on the stator 25, which impulses will have a definite time relation with reference to the position of the motor shaft 19.

As heretofore explained, energization of the primary 16 starts the synchronous motor 17 as an induction motor with the result that the alternating current induced in the field winding discharges through the discharge circuit including contact members 29 of the field switch 30, discharge resistor 31 and conductor 32.

Operation of the contactor 7 also closes the contact members 33 thereby establishing a circuit from the energized conductor 4 through contact members 33, conductor 34, back contact members 35 of the sequence control relay 36, conductor 37, actuating coil 38 of the sequence control relay 39 and conductor 40 to the energized conductor 2. Operation of the sequence control relay 39 causes the opening of the back contact members 41 which, therefore, places an open circuit in the circuit for the actuating coil 42 of the sequence control relay 36 so that this relay cannot be caused to operate once the attendant has selected motor 17 as the motor first to operate.

Operation of the sequence control relay 39 opens the contact members 43 thereby placing an open circuit in one of the possible energizing circuits for the actuating coil 44 of the field contactor 45, with the result that the field contactor 45 cannot be energized by a circuit including the contact members 43. Further, the operation of sequence control relay 39 causes the closing of the contact members 46 thereby closing one portion of the circuit including the actuating coil 47 of the anode energizing relay 48 adapted to control the energization of the anode 207 of the electric discharge device 175 explained more in detail hereinafter.

The operation of the sequence controlled relay 39 also causes the closing of the contact members 49 thereof thereby establishing a closed circuit for a portion of the circuit including the actuating coil 50 of the cathode energizing contactor 51.

One additional circuit is established by the operation of the contactor 7, which circuit may be traced from the energized conductor 4 through contact member 33, actuating coil 52 of the time limit device 12 to the energized conductor 9. The time limit device 12 is provided with a dash pot 53 which delays the closing of the contact members 54 of the time limit device 12 for an interval of time sufficient in length to permit the motor 17 to attain substantially its balanced speed, namely a speed somewhere in the neighborhood of 95% to 98% of synchronous speed. The time limit device need not be of the type shown but may be any kind of a switch having a delayed action such as an electric clock, a small synchronous motor, an inductive time limit relay or an ordinary clock set in operation by the operation of the contactor 7. However, the adjustment of whatever time limit device may be selected should be such that contact members 54 do not close prior to the time that the motor 17 has attained substantially its balanced speed.

When the motor has attained its balanced speed, contact members 54 are closed thereby establishing an energized circuit from the conductor 3 through conductor 4, contact members 33 and 54, conductor 55, back contact members 56 of the sequence control relay 36, conductor 57, actuating coil 58 of the field contactor 30 and conductor 59 to the energized conductor 10. It is, therefore, clear that the field contactor 30 is immediately energized after the closing of the contact members 54 and remains energized through contact members 60. In other words, insofar as the foregoing discussion related to the starting of motor 17 only, the system disclosed is a time limit control starting scheme and in and of itself and independent of the other features of the system of my control does not constitute part of my invention but represents a system of control well known in the art.

Energization of the actuating coil 58 causes the operation of the field contactor 30 which contactor is so designed that contact members 62 will close before the contact members 29 open and upon deenergization contact members 29 will close before contact members 62 open. The closing of contact members 62 connects the field winding of motor 7 to the source of direct current by a circuit which may be traced from the positive conductor 61 through contact members 62, field rheostat 63, conductor 32, one of the slip rings of the field winding, the field winding, the other slip ring, and thence to the negative conductor 64. The field winding being itself energized with direct current will cause the motor 17 to pull into synchronism and the motor will operate its load in the conventional manner.

After the motor 17 has been synchronized and is operating its load in the desired manner and it is necessary, or found desirable, to also connect the motor 170 to the same source of alternating current and the attendant wishes to so synchronize motor 170 that it shall have its shaft in a definite relation with reference to the shaft of motor 17, the attendant actuates the starting switch or push button 105, thereby establishing an energizing circuit from the conductor 3 through conductor 104, starting switch 105, actuating coil 106 of the contactor 107, stop switch 108 and conductor 109 to the conductor 40 and thence to the energized conductor 2. Contactor 107 will close contact members 111 thereby establishing a holding circuit for the actuating coil 106 and will also close the contact members 130, 140 and 150 thereby energizing the armatures or stator winding 160 of the motor 170.

The secondary or rotor carrying the field winding will thus begin to operate—operating as an induction motor—to drive the shaft 190 to which the load may be coupled and also drive the bars or members 120 and 121 of magnetizable material of the impulse generator 123. The members 120 and 121 may be adjustably secured to the shaft 190 by adjusting means 124 so that the impulses generated in the windings 127 and 128 of the stator 125 of the impulse generator 123 will have a definite positional relation to the shaft of the motor and thus the rotor 180. The stator 125 is rigidly secured to the stator of the motor 170 by means of the connection 126.

An alternating current will be induced in the field winding of the rotor in the well known manner and the current induced will circulate in the discharge circuit including the contact members 129, resistor 131 and conductor 132.

The operation of the contactor 107 also closes the contact members 133 thereby establishing an energizing circuit for the actuating coil 152 of the time limit device 312 having the dash pot 153. The time limit device 312 may be similar to the time limit device 12 and has the same function as time limit device 12.

The closure of the contact members 133 also establishes an energizing circuit from the energized conductor 104 through contact members 133, conductor 176, actuating coil 50 of the cathode energizing switch 51 and contact members 49 to the energized conductor 40. The switch 51 will thus be caused to operate, closing contact members 173, 181 and 184 and opening the contact members 182 and 183. The closure of the contact members 173 establishes an energizing circuit from the energized conductor 104 through conductor 171, the primary of the transformer 172 and contact members 173 to condutcor 40. The cathode 174 of the electric discharge device 175 will thus be energized immediately after the closing of the lower contact members on the contactor 107. The cathode 174 is connected to the negative conductor 64 of the source of direct current through conductor 177 and a portion of the resistor or potentiometer 178 and conductor 179. The adjustment of the conductor 179 determines the negative potential of the cathode 174.

The closing of the contact members 181 establishes a potential across the resistor or potentiometer 178 by a circuit that may be traced from the positive conductor 61 through contact members 181, resistor 178 and conductor 177 to the negative conductor 64. The opening of contact members 182 and 183 prevents energization of the portion of the system of control, shown in Fig. 1, that includes the electric discharge device 275.

The bias of the grid 185 with reference to the cathode 174 is determined by the potential across conductors 179 and 186 which is, in turn, determined by the potential existing between conductors 177 and 186. The potential of conductor 186 is, however, a function of the operation of the impulse generators 23 and 123. Coil 28 of the impulse generator is connected across the resistor 187. The circuit for this connection may be traced from the conductor 177 through resistor 187, conductor 188, back contact members 189 of the cathode energizing controlled switch 251, conductor 191, coil 28 and negative conductor 64 to the conductor 177.

Coil 128 of the impulse generator 123 on the other hand is connected across the resistor 287, the circuit for this connection may be traced from conductor 192, conductor 193, coil 128, conductor 194, back contact members 195 of switch 251, conductor 196 and resistor 287 to the conductor 192. Since the circuit between the grid 185 and the cathode 174 includes the conductor 179, a portion of the resistor 178, a portion of resistor 187, a portion of the resistor 287, and conductor 186, it is apparent that the bias of the grid with reference to the cathode is determined or influenced by the impulses generated in the coils 28 and 128. Therefore, if the members 120 and 121 have a different position on the shaft 190 with reference to the stator 125, than the position occupied by the members 20 and 21 on the shaft 19 with reference to the stator 25, it is apparent that when the rotors of the two machines are in exactly the same position, the impulses from the coils 28 and 128 will not be in synchronism or will not occur at the same instant. Simultaneous occurrences of the impulses of the two coils will only take place if the rotor of one of the motors is either behind or ahead of the position of the rotor of the other motor.

In the particular showing made in Figs. 1 and 2, the members 20 and 21, and 120 and 121 of both the impulse generators appear to be in the same position on the respective shafts, but it should be noted that the field connections at the slip rings are different for the two motors 17 and 170. It is, therefore, apparent that with machines of the same design and the same capacity, corresponding pole pieces of the two machines will have opposite polarity and, even if the mentioned members were mounted on the shaft in the same relation, the rotor positions of the two motors would nevertheless be different during operation.

Since, as explained, the bias of the grid 185 is a function of the impulses of both coils 28 and 128, it is readily apparent that the adjustment of the adjustable conductors shown in connection with the resistors 178, 187 and 287 may be so made that the electronic discharge device 175 breaks down or becomes conducting only when the impulses from the coils 28 and 128 occur at the same instant, namely when the voltages of these impulse generators are additive does the discharge device 175 break down.

To prevent premature operation of the electric discharge device, energization of the saturation coils 27 and 127 of the impulse generators 23 and 123, respectively, as well as positive energization of the anode 207 is delayed for an interval of time of sufficient length that the motor 170 may attain its balanced speed, namely a speed of 95% to possibly 98% of synchronous speed. This delay is accomplished by the time delay device 312.

After the necessary time delay, contact members 154 are closed by the time limit device 312 and in consequence actuating coil 47 of the anode energizing control relay 48 is energized. The circuit for this coil may be traced from conductor 104 through contact members 154, actuating coil 47 and contact members 46 to the energized conductor 40. Operation of the relay 48 establishes a circuit from the positive conductor 61 through adjustable resistor 200, contact members 201, contact members 184, conductor 202, coil 127 of the impulse generator 123, conductor 203 and coil 27 of the impulse generator 23 to the negative conductor 64. The impulse generators 23 and 123 and the stators 25 and 125 thereof are thus suitably energized with direct current to saturate the cores of the stator in any desired manner to aid in the production of a sharper impulse by the impulse coils 28 and 128.

Operation of the relay 48 also closes the contact members 205, thereby connecting the anode 207 to the positive conductor 61 by a circuit that may be traced through the resistor 204, contact members 205 and actuating coil 206 of the high speed field switch 208 to the anode 207. The actuating coil 206 will, however, not be energized to operate the high speed field switch 208 but is energized only when the discharge device 175 becomes conducting by reason of the concurrent action of the impulse coils 28 and 128.

For the assumptions made, it is apparent that at this stage of operation, motor 17 operates as a synchronous motor whereas motor 170 operates as an asynchronous motor operating somewhere near synchronous speed. The first instant after the operation of the time limit device 312 that the rotor shaft of the two motors 17 and 170 hold the position desired, the impulses of the coils 28 and 128 will occur at the same time thereby changing the bias of the grid 185 by an amount sufficient to cause the breakdown or the discharging of electric discharge device 175. When such discharge occurs, actuating coil 200 is energized and in consequence, contact members 209 are closed thereby establishing an energizing circuit for the field winding of the motor 170 by a circuit that may be traced from the positive conductor 61 through contact members 209, field rheostat 163, conductor 132, the field winding and thence to the negative conductor 84. The high speed field switch 208 is not designed to continuously carry the field current and is, therefore, provided with contact members 210 for energizing the main field switch 45. The energizing circuit may be traced from conductor 104 through contact members 154 and 210 and the actuating coil 44 of the main field switch 45 to the energized conductor 40. The main field switch 45 will thus operate to close the contact members 162 thereby establishing a low resistance shunt for the contact members 209 of the high speed field switch 208. Furthermore, operation of the main field contactor or switch 45 opens the discharge circuit for the field winding at the contact members 129. A holding circuit for coil 44 is also established through contact members 211.

If the attendant wishes to start motor 170 first and thereafter wishes to synchronize motor 17 in such a manner that the motor shaft may have a definite relation to the rotor shaft of motor 170, he actuates the starting switch 105 thereby synchronizing motor 170 by a time limit control which is effected by the time limit device 312 in exactly the manner hereinbefore discussed in connection with the starting of motor 17. However, in this instance the closure of the contact members 133 establishes a circuit from the energized conductor 104 through contact members 133, back contact members 41 of the sequence control relay 38 which will of course, be deenergized and actuating coil 42 to the energized conductor 10. The sequence control of relay 36 is, therefore, caused to operate when motor 170 is started first with the result that time limit starting control of motor 17 is prevented by the opening of contact members 56 and the closure of contact members 212 and 215 will set up the necessary circuits for properly synchronizing motor 17 in a definite relation to the motor 170 when it is desired to start motor 17.

After the motor 170 has become properly synchronized, the attendant may actuate the starting switch 5 and affect the starting of the motor 17 as an induction motor exactly as hereinbefore explained. However, since contact members 215 are closed when motor 170 is already operating, a circuit is established from the energized conductor 4 through contact members 33, conductor 217, actuating coil 216 and contact members 215 to the energized conductor 10. The cathode energizing control relay 251 is thus caused to operate, closing the contact members 218, 224 and 240 and opening the contact members 189 and 195.

The opening of contact members 189 and 195 disconnects certain portions of the control associated with the discharge device 175. Closure of contact members 240 merely provides a closed circuit in the portion of this circuit including the coils 127 and 27 of the impulse generators 123 and 23, respectively.

The closure of contact members 218 establishes an energizing circuit from the conductor 4 through conductor 221, primary of transformer 219, contact members 218 to conductor 10, thereby causing the energization of the cathode 220 of the electric discharge device 275 from the transformer 219. A negative potential of a certain value is applied to the cathode 220 by a circuit that may be traced from the negative conductor 64 of the source of direct current through conductor 226, a portion of the resistor 222 and conductor 223 to the cathode 220. The closure of contact members 224 merely connects the potentiometer or resistor 222 across the source of direct current, namely across conductors 61 and 64 by a circuit including contact members 224 and the potentiometer resistor 222 and conductor 226.

The bias of the grid 33 with reference to the cathode 220 is determined by the potential across conductors 223 and 225 which, in turn, is determined by the potential across the conductors 226 and 225. The potential of conductor 225 with reference to the conductor 226 is, however, determined by the variations in potential caused by the coils 28 and 128 of the impulse generators 23 and 123, respectively. Coil 28 is connected across the resistor 227. The circuit for this connection may be traced from conductor 226 through conductor 64, coil 28, conductor 191, conductor 229, contact members 182, conductor 228 and resistor 227 to the conductor 226. Coil 128 is connected across the resistor 230. The circuit for this connection may be traced from conductor 192 through conductor 193, coil 129, conductor 194, contact members 183, conductor 231 and resistor 230 to the conductor 192. By properly adjusting the adjustable conductors on the respective resistors 222, 227 and 230, the potential of the grid 233 may, of course, be so selected that discharge device 75 becomes conducting or discharges only when the impulses of the coils 28 and 128 occur at the same time. By properly adjusting the relative position on the shaft of the motor of the rotating members, of the impulse generators, it is apparent that motor 17 may be pulled into synchronism at any selected position with reference to the motor 170. By any position in this instance, it is, of course, meant any position permitted by the design, namely the number of poles of the two machines.

When the impulses of the impulse generators occur at the same time, discharge device 275 becomes conducting and in consequence actuating coil 236 of the high speed field switch 237 is energized by a circuit that may be traced from the positive conductor 61 through resistor 234, contact members 235, actuating coil 236, anode 238, cathode 220, conductor 223 and a portion of the resistor 222 to the negative conductor 64. Of course, contact members 235 would only be closed if the time limit device 12 has operated to establish an energizing circuit for the actuating coil 213 of anode energizing control relay 214. Furthermore, the operation of relay 214 closes a circuit from the positive conductor 61 through adjustable rheostat 338, contact members 239 and 240, conductors 241 and 202, coil 127 of the impulse generator 123, conductor 203 and coil 27 of the impulse generator 23 to the negative conductor 64.

The instant high speed field switch 237 operates, contact members 341 are closed thereby establishing an energizing circuit for the main field switch 30 by a circuit that may be traced from conductor 4 through contact members 33, 54 and 341, actuating coil 58 of the main field switch 30 and conductor 59 to the energized conductor 10. Operation of the main field switch 30 establishes a shunt for the contact members 242 of the high speed field switch 237 thereby relieving these contact members of the duty of continuously carrying a comparatively heavy current. Further, operation of the main field switch 30 opens the discharge circuit in the manner hereinbefore explained.

The operation of the main field switch 30 of course energizes the field winding of the motor 17 and causes this motor to pull into synchronism in such a manner that the shaft of motor 17 has a definite selected relation with reference to the shaft 19.

I am, of course, aware that others skilled in the art, particularly after having had the benefit of the teachings of my invention may devise other circuit diagrams than the particular diagram I have shown for accomplishing the novel results of my invention. However, I do not wish to be limited to the particular circuit diagrams shown or described but wish to be limited only by the appended claims and the pertinent prior art.

I claim as my invention:

1. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators having voltage characteristics indicative of the position of certain points on the motor shafts with reference to corresponding planes including the axes of the respective motors, an electric discharge device responsive to the voltage of the said generators and thus adapted to become energized when a certain relation exists between the motor shafts, and switching means responsive to said discharge device adapted to connect the field winding of the second motor to said source of direct current.

2. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators having voltage characteristics indicative of the position of certain points on the motor shafts with reference to corresponding planes including the axes of the respective motors, an electric discharge device responsive to the voltage of the said generators and thus adapted to become energized when a certain relation exists between the motor shafts, and switching means responsive to said discharge device adapted to connect the field winding of the second motor to said source of direct current, means responsive to a certain combined voltage of said generators adapted to energize the field winding of the second motor from said source of direct current whereby said synchronous motors are synchronized so that corresponding points on the motor shafts hold selected positions, at the same instant, with reference to said planes.

3. In an electrical system of control for synchronous motors, in combination, a synchronous motor having an armature winding and a field winding, a source of alternating current, means for connecting said armature winding to said source of alternating current, a source of direct current, means for connecting said field winding to said source of direct current, an impulse generator coupled to the rotating element of said synchronous motor, a second synchronous motor having an armature winding and a field winding, means for connecting the armature winding of said second synchronous motor to said source of alternating current, switching means for connecting the field winding of said second synchronous motor to said source of direct current, a second impulse generator so coupled to the second synchronous motor that the impulse generated thereby will be in electrical phase with the impulse generated by the first impulse generator when corresponding points on the rotating elements of the synchronous motors are out of mechanical phase, electronic means responsive to the combined magnitude of the in-electrical-phase impulses of the impulse generators when one of said generators is operated at the synchronous speed of the synchronous motor to which it is coupled and the other is operated at a speed near the synchronous speed of the synchronous motor to which it is coupled, said switching means being interconnected with said electronic means and adapted to be operated in response to energization of said electronic means.

CHARLES C. SHUTT.